Jan. 10, 1933.  B. C. TRAVIS  1,893,810

PORTABLE MACHINE FOR BORING TAPERED ELLIPTICAL HOLES

Filed April 6, 1927   2 Sheets-Sheet 1

Jan. 10, 1933.  B. C. TRAVIS  1,893,810
PORTABLE MACHINE FOR BORING TAPERED ELLIPTICAL HOLES
Filed April 6, 1927   2 Sheets-Sheet 2

Inventor
Bertram C. Travis
by
his Attorney

Patented Jan. 10, 1933

1,893,810

UNITED STATES PATENT OFFICE

BERTRAM C. TRAVIS, OF LOS ANGELES, CALIFORNIA, ASSIGNOR OF ONE-HALF TO PACIFIC COPPER AND BRASS WORKS, INCORPORATED, OF LOS ANGELES, CALIFORNIA, A CORPORATION OF CALIFORNIA

PORTABLE MACHINE FOR BORING TAPERED ELLIPTICAL HOLES

Application filed April 6, 1927. Serial No. 181,374.

This invention has to do with a boring machine and it is an object of the invention to provide a practical, accurate machine for boring elliptical holes, or the like.

I have, in my co-pending application, filed on even date herewith, entitled "Device for forming elliptical parts", set forth a device operable to machine or form elliptical plugs, or the like, suitable for use in boilers, condensers, etc. This application is concerned primarily with a machine that can be used in boring elliptical holes such as may be used to receive the elliptical parts produced by the device set forth in the said co-pending application. In view of the fact that the invention is of particular value in connection with boilers, tanks, condensers, and like structures, I will describe the present machine as applied to a boiler plate for the purpose of boring an elliptical hole therein, it being understood, however, that such reference is not to be construed as a restriction or limitation of the broader principles of the invention.

It is an object of the present invention to provide a machine which will operate to effectively and accurately cut an elliptical hole in a plate, or the like.

It is another object of the invention to provide a machine of the type mentioned which is portable and capable of being easily handled and operated.

Another object of the invention is to provide a simple, practical and effective arrangement and combination of parts in a machine of the character mentioned.

The various objects and features of the invention will be best and more fully understood from the following detailed description of a typical form and application of the invention, throughout which description reference is had to the accompanying drawings, in which.

Figure 1:
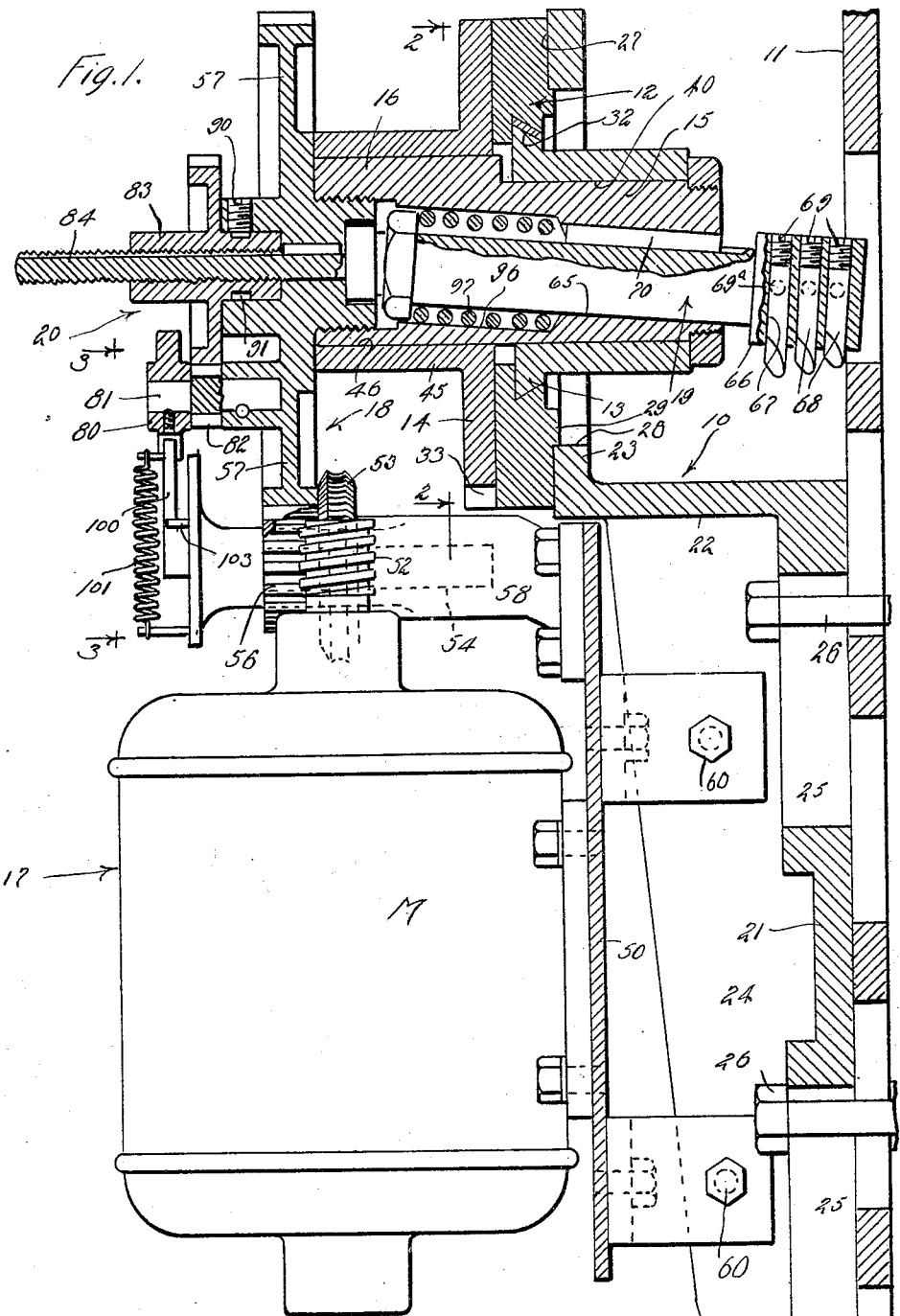
Fig. 1 is a sectional view of the machine provided by my invention, showing it in position on a boiler plate.
Figure 2:
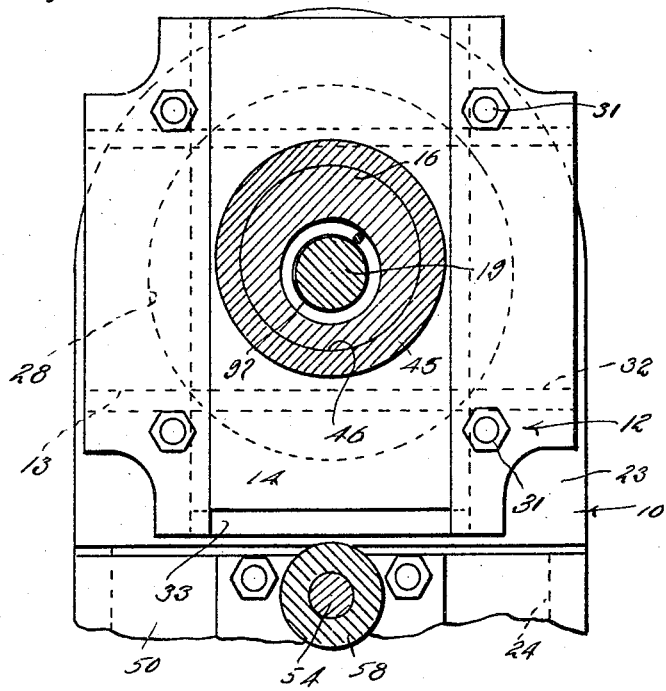
Fig. 2 is a transverse, sectional view of the machine, being a view taken as indicated by line 2—2 on Fig. 1.
Figure 3:
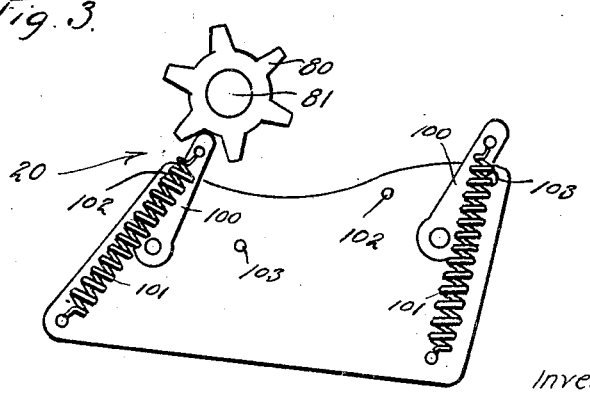
Fig. 3 is a view taken as indicated by line 3—3 on Fig. 1.

The machine provided by my invention includes, generally, a mounting bracket 10 to be applied to a boiler plate 11, or the like, a guide 12 carried by the bracket, slides 13 and 14 carried by the guide, a spindle 15 carried by the slide 13, an eccentric 16 on the spindle and carried by the slide 14, power means 17, a drive 18 between the power means 17 and the spindle 15, a tool carrier 19 carried by the spindle, and feed means 20 for advancing or feeding the tool carrier.

The mounting bracket 10, shown in the drawings, includes, generally, a base 21 to engage the plate 11, an arm 22 projecting from the base, and a head 23 carried by the arm so that it is spaced from and parallel to the plate 11 to which the bracket is applied. The mounting bracket may be provided with spaced ribs 24 which join the arm 10 and the base 21 to strengthen the bracket and make it rigid. The base 21 may be secured to the plate 11 in any suitable manner; for instance, it may be provided with openings 25 to register with openings in the plate 11 so that bolts 26 can be used to mount the bracket on the plate.

The guide 12 is carried by the head 23 of the mounting bracket and, in the preferred arrangement, the guide is applied to the outer face 27 of the head. The head 23 is provided with a comparatively large, round opening 28, which receives a round part 29 on the guide member. The part 29, in fitting the opening 28 locates the guide centrally with reference to the head. In the preferred construction, the guide is detachable from the head 23. It may be mounted on the head by means of bolts 31 so that it can be removed easily and quickly. The guide 12 is in the form of a plate provided at its two sides with guideways extending in opposite directions. The guideway 32, provided in the inner side of the guide 12, carries the slide 13. The guideway 33, provided in the opposite or outer side of the guide 12, carries the slide 14. In accordance with my invention, the guides 32 and 33 extend in opposite directions, or are arranged at right angles to each other, and in the particular case illustrated, the guide 33 is disposed longitudinally of the tool or machine, while the guide 32 is transverse thereof.

The slide 13, carried in the guideway 32, has a projecting part provided with a central opening 40 which rotatably carries the spindle 15. In the particular construction shown, the slide 13 and guideway 32 are fitted, for instance, dove-tailed, so that they remain in the proper operating relation.

The spindle 15 is rotatably carried in the slide 13 and projects outwardly from the slide 13 through the guide 12 and into the slide 14. The eccentric 16 is provided or formed on the spindle 15 at the slide 14, and the slide 14 is provided with a projection 45 having an opening 46 in which the eccentric operates. With the construction thus far described, the spindle 15 is related to the slides and eccentric so that it moves bodily in an elliptical path when rotated.

The power means 17, provided for driving the machine, is preferably an electric motor mounted on the bracket 10. In the construction illustrated, a motor M is mounted on a plate 50 carried by the ribs 24 of the bracket 10.

In using an electric motor 17 as a drive means, it is necessary to provide a drive 18 between the motor and spindle 15 which will effect a substantial speed reduction between the motor and spindle. In the particular arrangement illustrated, the drive means 18 includes a worm 52, mounted on the motor shaft to drive a worm wheel 53. The worm wheel 53 is mounted on a shaft 54 which carries a pinion 56. The pinion 56 meshes with a large gear 57 mounted on the outer end of the spindle 15 beyond the eccentric 16. The vertical movement of the gear 57 during operation, caused by the elliptical movement of the spindle 15, is not sufficient to cause the unmeshing of the gear 57 and pinion 56. The shaft 54 is carried in a bearing 58 mounted on the plate 50 so that the plate 50, motor M, worm 52, worm wheel 53, pinion 56, shaft 54 and bearing 58 form a unit which can be handled separately from the rest of the machine. In practice, the unit just described may be detached from the mounting 10 by releasing bolts 60 which operate to connect the plate 50 with the ribs 24 of the bracket 10. Further, in practice, the motor M may be shifted on the plate 50 to engage opposite sides of the worm wheel 53. This shifting of the motor M may be desirable in cases where the machine is being operated in a limited space. The large gear 57 may be applied to the spindle 15 in any suitable manner. In the drawings I have shown the gear provided with a screwthreaded hub 61 which screwthreads into an opening provided in the end of the spindle.

The tool carrier 19 is carried in a socket 65 extending into the spindle 15 from its inner end. The socket extends into the spindle at an angle with reference to the central axis of the spindle so that the tool carrier is angularly disposed with reference to the spindle in the manner clearly illustrated in Fig. 1 of the drawings. The tool carrier projects from the socket and is provided with a head 66 with openings 67 to carry cutters 68. The cutters 68 may be adjusted through screws 69 so that they extend different distances from the head and thus operate successively as the tool is operated so that the first cutter takes a roughing cut, the second cutter takes a middle cut, and the last cutter takes a finishing cut. The cutters may be set in adjusted position by set screws 69a. The angularity of the tool cutter with reference to the spindle determines, or governs, the taper of the hole bored by the tool, as the hole is bored by rotation of the spindle 15 and its elliptical movement and by the feeding of the tool carrier so that the cutters operate on the plate 11. The tool carrier is slidably mounted in the socket and is held against rotation as by means of a key 70.

The means provided for feeding the tool carrier may include a trip wheel 80 mounted on a shaft 81 which carries a pinion 82. The pinion 82 meshes with teeth on a feed nut 83. The feed nut 83 is screwthreaded on a stem 84 which extends through the hub 61 of the large gear 57 and engages the inner end of the tool carrier. The trip wheel 80 may be tripped in any suitable manner. I provide one or more pivotally mounted trip arms 100 normally held in position to trip the wheel by spring 101. The springs normally hold the arms 100 in operating position against stops 102. To put the arms out of operating position, they are swung so that the springs pass the pivotal axes of the arms and, therefore, operate to hold the arms against stop 103. This construction allows the arms to move if the wheel does not engage them in the proper manner. The feed nut 83 is retained in position with reference to the large gear 57 by a pin 90 carried by the large gear to extend into a groove 91 in the member 83. The stem 84 is slidably keyed in the hub of the large gear so that when the feed nut 83 is rotated, the stem is moved longitudinally. The inner end of the stem is provided with an inclined face 92 which engages the inner end of the tool carrier and as the stem 84 is fed inwardly through the action of the feed nut, the tool carrier is fed or advanced so that the cutters 68 are fed into cutting engagement with the plate 11. In the preferred construction, the socket 65 is provided at its inner end with an enlarged part 96 which carries a spring 97 that acts to normally hold the tool carrier in an in position and which operates to return the carrier when the stem 84 is retracted.

In the operation of the machine, it is applied to a plate 11, or the like, in a manner such as I have shown in the drawings. The motor M, being arranged in the desired manner on the plate 50, is put in operation to drive the spindle 15 through the drive means above described. As the spindle rotates, it is influenced by the slides and eccentric so that it has an elliptical movement, thus causing the cutters carried by the tool carrier to move in an elliptical path. As the cutters are thus moved, the feed means operates to advance the tool carrier so that the cutters are moved into engagement with the work or plate 11 with the result that the cutters cut a tapered, elliptical hole in the plate. If the machine is constructed so that the tool carrier is concentric with the spindle 15, the machine will operate to cut a straight elliptical hole. In practice, it is desirable to machine or otherwise cut round holes in the plate 11 before operating the present machine so that the present machine merely operates to ream or enlarge the round holes to make them elliptical and tapered, if the machine is made in the manner shown in the drawings. In handling the machine, that is, in moving it from one plate 11 to another or in shifting it on a plate 11, the plate 50 may be detached from the mounting bracket by releasing the nuts 60, thus making it possible to move the motor, the plate 50, the worm 52, worm wheel 53, shaft 54, bearing 58 and pinion 56 as a unit separate from the rest of the machine, and the guide 12 with the slides and various parts carried by and directly connected with the slides, including the large gear 57, may be moved as a unit separate from the mounting bracket. By thus being able to handle the machine in units or sections, it can be easily handled by one man.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A machine of the character described including a guide member, slides carried by the member to slide in directions at right angles to each other, a spindle rotatably carried in one of the slides, a tool carrier carried in the spindle for movement longitudinally of the spindle on an axis at an angle to the axis of the spindle and projecting from an end of the spindle, and an eccentric on the spindle and carried in the other slide.

2. A machine of the character described including a guide member, slides carried by the member to slide in directions at right angles to each other, a spindle rotatably carried in one of the slides, an eccentric on the spindle and carried in the other slide, power means for rotating the spindle, a tool carrier carried by the spindle, for movement longitudinally of the spindle and at an angle to the axis thereof and feed means for advancing the tool carrier longitudinally with relation to the spindle.

3. A unitary machine of the character described including a guide member, slides carried by the member to slide in directions at right angles to each other, a spindle rotatably carried in one of the slides, an eccentric on the spindle and carried in the other slide, power means for rotating the spindle, a tool carrier slidably carried in the spindle for longitudinal movement thereof, and automatic feed means for advancing the tool carrier when the spindle is rotated, the feed means including a stem engaging the tool carrier, a nut for operating the stem, and a trip device for operating the nut.

In witness that I claim the foregoing I have hereunto subscribed my name this 30th day of March, 1927.

BERTRAM CECIL TRAVIS.